United States Patent [19]

Brinkmann et al.

[11] Patent Number: 4,669,292

[45] Date of Patent: Jun. 2, 1987

[54] UNDERFLOOR WHEEL SET BARRING MACHINE FOR RETREADING OF RIM CIRCUMFERENCES OF RAILROAD WHEEL SETS

[75] Inventors: Dirk Brinkmann, Lunen-Niederaden; Uwe Gutöhrlein, Dortmund, both of Fed. Rep. of Germany

[73] Assignee: Hoesch Aktiengesellschaft, Fed. Rep. of Germany

[21] Appl. No.: 798,741

[22] Filed: Nov. 15, 1985

[30] Foreign Application Priority Data

Nov. 15, 1984 [DE] Fed. Rep. of Germany ... 8433487[U]

[51] Int. Cl.⁴ .............................................. A01N 37/10
[52] U.S. Cl. ....................................... 72/107; 72/108; 29/803
[58] Field of Search .................... 29/168, 803; 72/102, 72/107, 108, 109, 110; 474/86; 74/665 GE

[56] References Cited

U.S. PATENT DOCUMENTS

| 734,041 | 7/1903 | Buhoup et al. | 72/69 |
| 3,367,160 | 2/1968 | Sperber et al. | 29/168 |
| 3,464,253 | 9/1969 | Beyer et al. | 72/110 |
| 4,583,271 | 4/1986 | Diener | 72/108 |

FOREIGN PATENT DOCUMENTS 1269726 7/1961 France .

Primary Examiner—Percy W. Echols

[57] ABSTRACT

An underfloor wheel set barring machine for retreading of wheel rim circumferences of railroad wheel sets. Two driven pairs of friction rollers can be pressed against a wheel rim circumference with the friction rollers of each pair being arranged to pivot parallel to the axis of the wheel set. A drive motor has first and second smooth belt drives having a common drive wheel driven by the motor. Each belt drive has an output wheel driving an input gear of a spur gear system. Two spur gear systems have upward members respectively driving the friction rollers. The output of each belt drive is coaxially arranged with the axis of its associated friction roller.

3 Claims, 5 Drawing Figures

UNDERFLOOR WHEEL SET BARRING MACHINE FOR RETREADING OF RIM CIRCUMFERENCES OF RAILROAD WHEEL SETS

BACKGROUND OF THE INVENTION

The invention relates to an underfloor wheel set barring machine for retreading the rim circumferences of railroad wheel sets, with two driven pairs of friction rollers which can be pressed against a rim circumference of a wheel set, with the friction rollers of each pair of friction rollers being pivotable singly around a pivoting axis each arranged parallel to the axis of the wheel set.

In an underfloor wheel set barring machine according to French Patent No. FR-PS 1269726, each pair of friction rollers is driven by two rotary driving means, each of which consists of a geared engine and a universal joint shaft.

Such rotary driving means for a pair of friction rollers are relatively complex.

It is an object of the present invention to provide a rotary driving means for each pair of friction rollers of an underfloor wheel set barring machine of the type named above, which driving means can be manufactuerd simply and with less effort.

SUMMARY OF THE INVENTION

According to the invention, this object is attained in that a rotary driving means is provided for each pair of friction rollers, which driving means has a motor, a distributor gear consisting of two belt drives and two spur gear systems.

Each spur gear system can be formed as a plug-in transmission.

According to a further feature of the invention, each spur gear system is aligned axially with its input axle relative to a pivoting axis of a friction roller. The invention provides that small differences in the rotation of the two friction rollers of each pair of friction rollers are equalized by the stretch slippage of the belt drives of the distributor gear. Such differences may result from differences in diameter of the friction rollers and the flat spots at the wheel circumference.

DETAILED DESCRIPTION OF PREFERRED EMBODIMENTS

Figure 1:
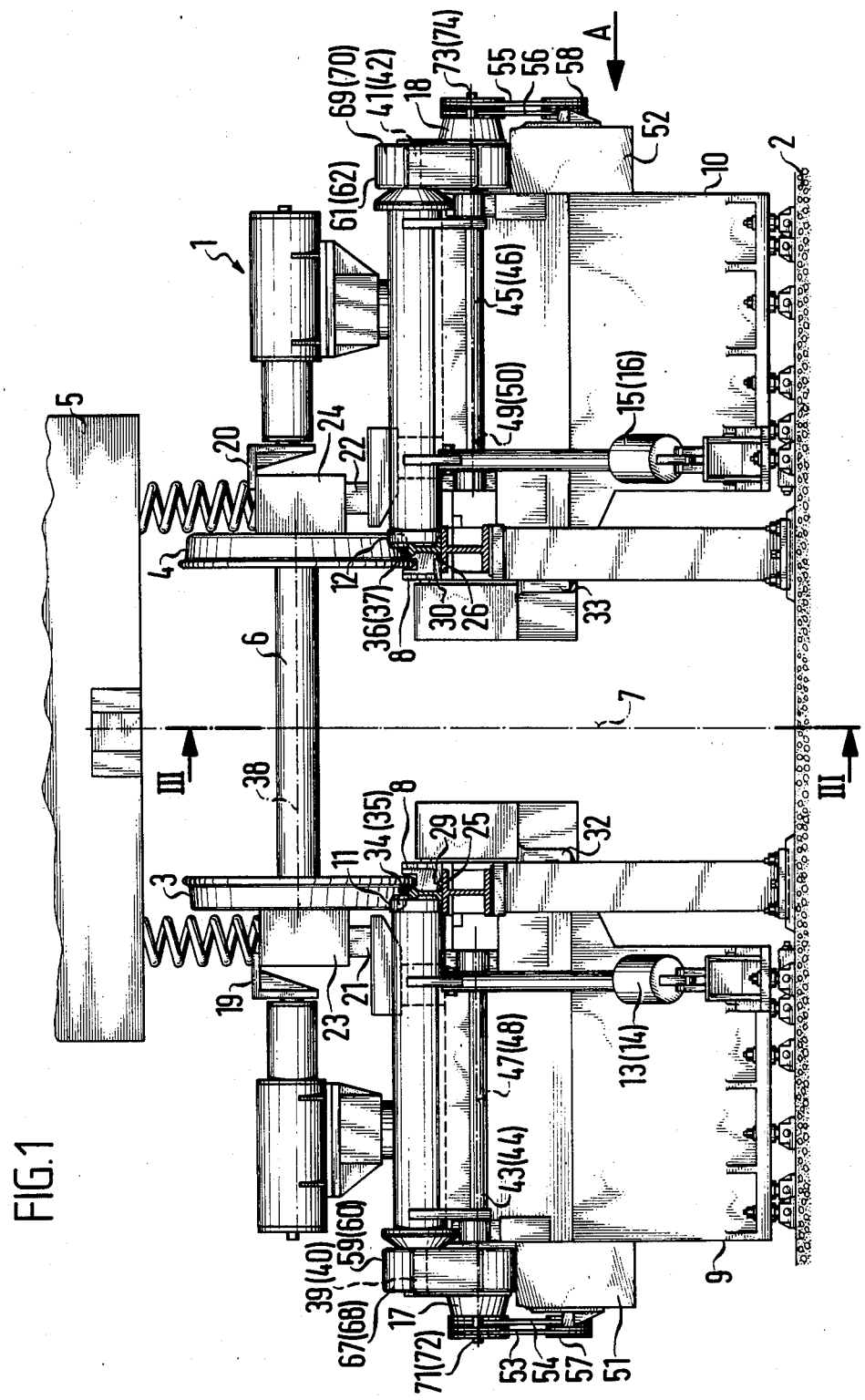
FIG. 1 shows an underfloor wheel set barring machine and a wheel set in elevation which is held by it, with a partial elevation of a vehicle chassis sitting on the wheel set, with a section through two input rails and two rail carriers and with a partial section through a base.
Figure 2:
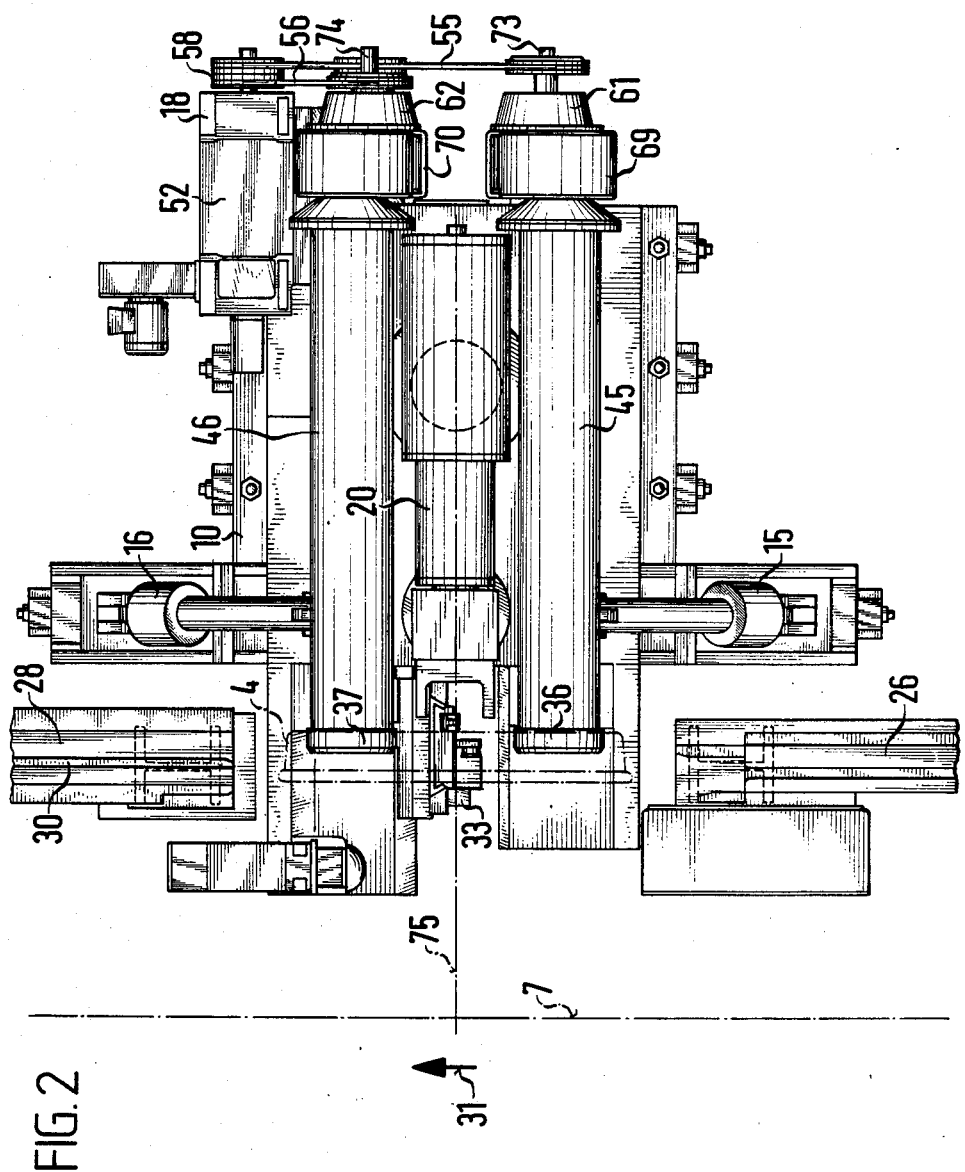
FIG. 2 illustrates the right hand side of the machine unit of the underfloor wheel set barring machine in horizontal projection with dash-dotted representation of the right hand side wheel circumference of the inserted wheel set on an enlarged scale.

An underfloor wheel set barring machine 1 which is firmly connected with a base 2, is used for retreading of the rim circumferences 3,4 of a wheel set 6 installed in a rail vehicle 5.

The underfloor wheel set barring machine 1 has two machine units 9, 10 which are symmetrically arranged toward the center 7 of a driving rail track 8. Each unit has a pair of friction rollers 11, 12 with two pivoting drives 13, 14, 15, 16 and a rotary driving means 17, 18, a holding down device 19, 20 as well as a support device 21, 22 for a driving box 23, 24 of the wheel set 6.

Parts of the rail track 8 are two input rails 25, 26 and two output rails 27, 28, as well as two bridging rails 29, 30 for bridging the area between the input rails 25, 26 and the output rails 27, 28.

The bridging rails 29, 30 are shiftably arranged in the direction of the driving track, so that they can be removed from the operating area of the two rotating supports 32, 33.

The pairs 11,12 of the friction rollers consist of two friction rollers each, 34, 35, 36, 37, each on a shaft 39, 40, 41, 42, extending parallel to the axis of the wheel set 38.

Each shaft 39, 40, 41, 42 is doubly journaled in a link gear 43, 44, 45, 46 with a pivoting axis 47, 48, 49, 50 which extends parallel to the wheel axle 38.

Each link gear 43, 44, 45, 46 is pivotally arranged at a pivoting drive 13, 14, 15, 16.

The friction rollers 34, 35, 36, 37 of each pair of friction rollers 11, 12 are connected with a rotary driving means 17, 18. Said means includes a motor 51, 52, a distributor gear 57, 58, consisting of two belt drives 53, 54, 55, 56 and two spur gear systems 59, 60, 61, 62.

Each spur gear system 59, 60, 61, 62 is a plug-in transmission whose hollow drive shaft 63, 64, 65, 66 is inserted into a shaft 39, 40, 41, 42.

The housing 67, 68, 69, 70 of each spur gear system is firmly connected with screws (not shown) to a link gear 43, 44, 45, 46.

Figure 5:
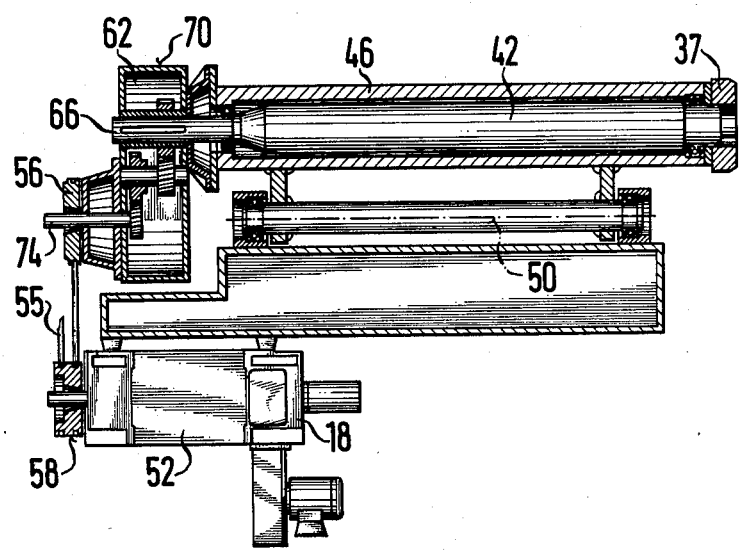
FIG. 5 is a section through the right hand side of a machine unit of the underfloor wheel set barring machine according to line V—V in FIG. 4.

The input shaft 71, 72, 73, 74 of each spur gear system 59, 60, 61, 62 extends axially to a pivoting axis 47, 48, 49, 50 thus, during pivoting of the friction rollers 34, 35, 36, 37 the axial distances of the belt drives 53, 54, 55, 56 remains unchanged (FIG. 5).

In bringing the wheel set 6 into the underfloor wheel set barring machine 1, it is first rolled over the input rails 25, 26 and the bridging rails 29, 30 in the direction of the driving rail track 31 up to the center 75 of the machine. Thereafter, the wheel set 6 is lifted by pivoting of the friction rollers 34, 35, 36, 37 in the direction of the center 75 of the machine somewhat above the level of the driving rail track.

In the lifted position of the wheel set 6, the bridging rails 29, 30 are moved in the direction of the driving rail track 31 out of the operating area of the rotation supports 32, 33. The two driving boxes 23, 24 of the wheel set 6 are held in place through the hold down device 19, 20 and the support means 21, 22 (FIGS. 1, 3 and 4).

Figure 3:
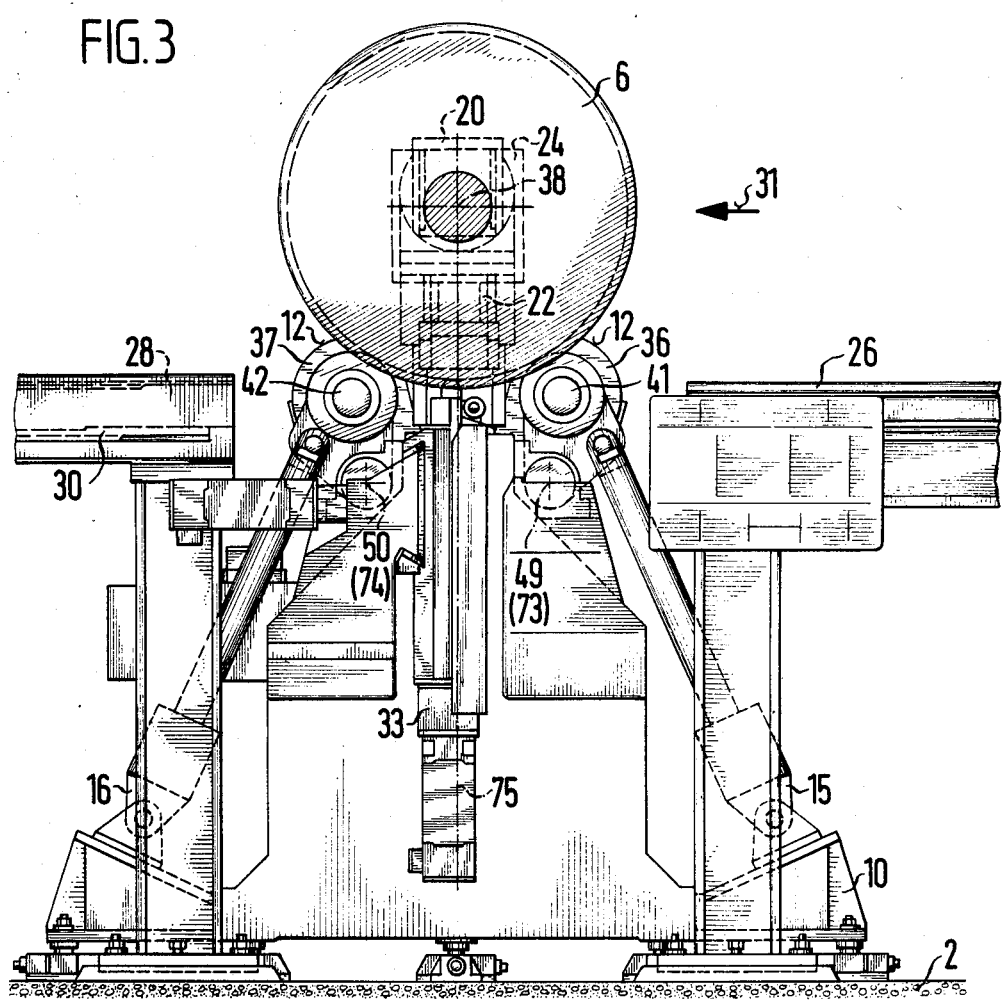
FIG. 3 is a section according to line III—III in FIG. 1 on an enlarged scale.
Figure 4:
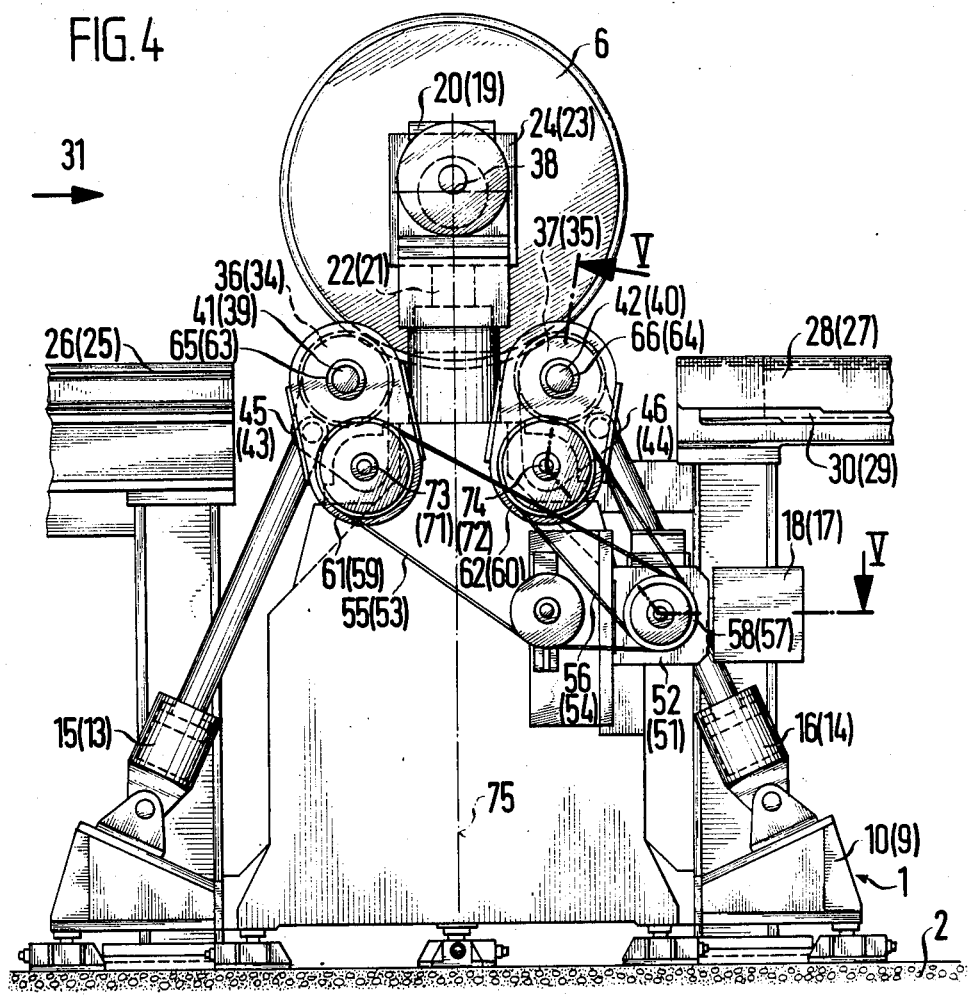
FIG. 4 is a side elevation of an underfloor wheel set barring machine and the wheel set held by it, in direction of the arrow A in FIG. 1, with a partial section through the base on an enlarged scale.

In the position of the wheel set 6 shown in FIGS. 1, 3 and 4 the retreading of the wheel rim circumferences 3, 4 occurs through the rotation supports 32, 33. In this connection the rotary drive means 17, 18 impart a rotating movement on the friction rollers 34, 35, 36, 37 and the wheel set 6.

After retreading of the wheel rim circumferences 3,4, the rotation supports 32, 33 are successively removed from the operating area, the bridging rails 29, 30 are moved into the area between the input rails 25, 26 and the output rails 27, 28, and the wheel set 6 is lowered by pivoting of the friction rollers 34, 35, 36, 37 onto the bridging rails 29, 30.

Subsequently the wheel set 6 is rolled via the bridging rails 29, 30 and the output rails 27, 28 out of the underfloor wheel set barring machine 1. Thereafter, the underfloor wheel set barring machine 1 is available for retreading of the wheel rim circumferences of another wheel set.

We claim:

1. Underfloor wheel set barring machine for retreading of the wheel rim circumference of railroad wheel sets, with two driven pairs of friction rollers, each of which can be pressed against a wheel rim circumference of a wheel set, with the friction rollers of each pair of friction rollers being arranged for single pivoting around a pivoting axis which is parallel to the axis of the wheel set, characterized in that two rotary drive means are provided, each drive means driving a pair of said friction rollers and comprising a drive motor, a first smooth belt drive and a second smooth belt drive having a common drive wheel driven by said motor, each belt drive having an output wheel driving an input gear of a spur gear system, each spur gear system having an output member connected to one of said pair of friction rollers, the output wheel of each belt drive being coaxially arranged with the pivoting axis of the associated friction roller.

2. Underfloor wheel set barring machine according to claim 1, characterized in that the spur gear systems are of identical structure.

3. Underfloor wheel set barring machine according to claim 1, characterized in that each spur gear system is a plug-in transmission.

* * * * *